Figure 1:
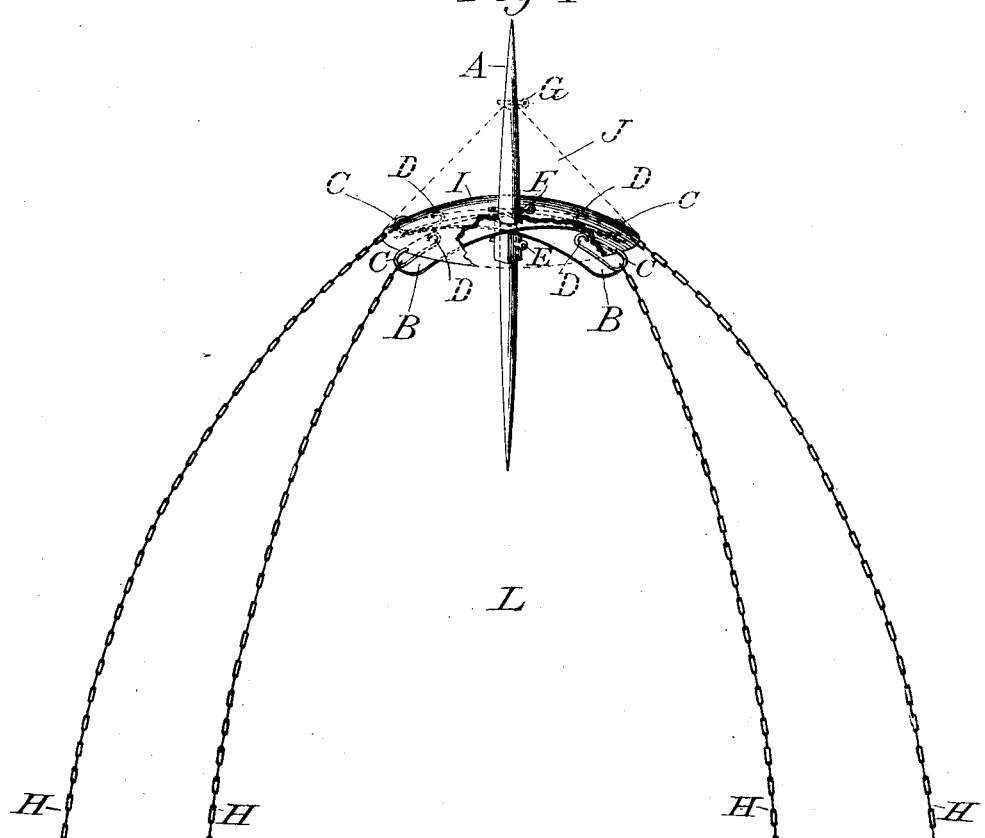

(No Model.)

F. SCHAUER.
GRAIN STACK PROTECTOR.

No. 328,071. Patented Oct. 13, 1885.

Witnesses: Inventor.

United States Patent Office.

FLORIAN SCHAUER, OF CHICAGO, ILLINOIS.

GRAIN-STACK PROTECTOR.

SPECIFICATION forming part of Letters Patent No. 328,071, dated October 13, 1885.

Application filed February 27, 1884. Serial No. 122,254. (No model.)

*To all whom it may concern:*

Be it known that I, FLORIAN SCHAUER, a citizen of the United States, residing at the city of Chicago, in the county of Cook and State of Illinois, have invented a new and useful Grain-Stack Protector, of which the following is a specification.

My invention relates to an improvement in grain-stack protectors, in which two cross-pieces are held in placed upon a bar slipped into the grain-stack, upon which cross-pieces a tin cover large enough to cover the upper portion of the grain-stack rests, as shown in the drawings 1 and 2; and the objects of my improvement are to provide a covering for the top of the grain-stack, so as to protect the grain therein contained from rains, snow, and other inclemencies of the weather, as well as to keep the grain from being uncovered or scattered by the action of the wind. I attain these objects by the mechanism illustrated in the accompanying drawings, which form a part of this specification, in which—

Figure 2:
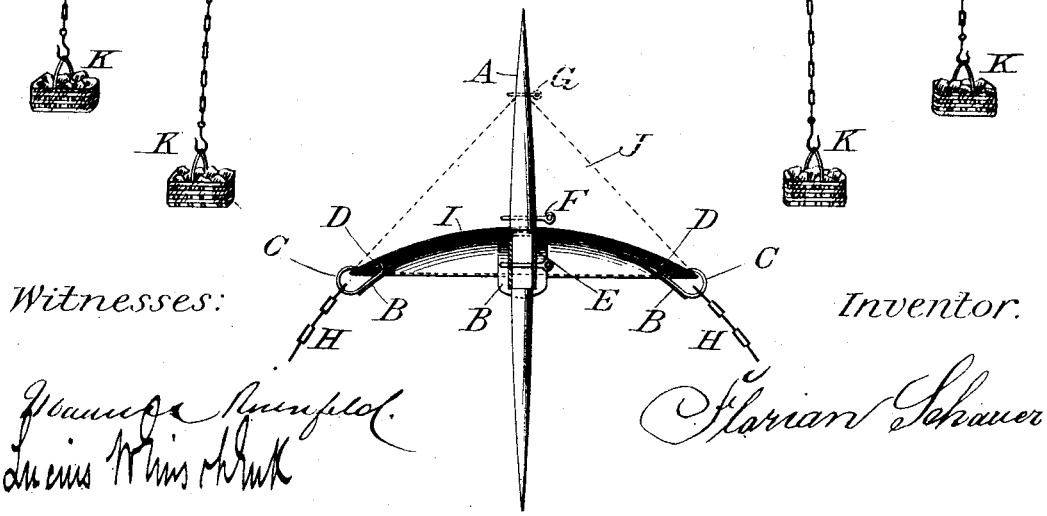

Figure 1 is a side view of the device. Fig. 2 is a vertical sectional view of the same with the chains broken off.

A is a long iron bar about an inch or more in diameter, and may be made from six to ten feet in length. In the center of the bar it is cut square, thus dividing the bar into two sections. Below this square-cut portion the bar is a little thinner and gradually tapers off to a sharp point. Above this square-cut portion rest the cross-plates B. The bar A is designed to be stuck in the center of the top of the grain-stack, as shown in Fig. 1.

L represents the grain-stack, and the bar A rests in it, as it is designed it should rest in the grain-stack.

B are two cross-pieces—that is, two pieces of iron about two inches wide and from four to six feet long, and in case of very large stacks somewhat longer. These pieces are round at the ends and have at each end two hooks, the outer hooks being large and curved inwardly, and are marked C. The inner hooks are smaller and curved outwardly, and marked D. The pieces marked B have a square hole cut into their center, through which the bar A is slipped, so that the thicker or upper portion of the bar shall be on top. The two pieces B are to cross each other, and the bar A to run through them, as already stated. These pieces B are slightly bent, so as to form an arc of a circle, and then adjusted to bar A to curve downward, as shown in Fig. 1.

At the bottom of one of the pieces B, surrounding the hole through which the bar A runs, is attached a four-cornered piece of iron hollow in the center, through which the bar A runs after passing through the pieces B. This last-described part is marked E. Through opposite sides of tube E holes are cut in line with each other. A similar hole is cut through the bar A, so as to correspond with the holes in E. A bar of iron a little longer than the width of E is then inserted in the hole through E and A, so as to hold them in place. The cross-pieces B are also necessary to keep the bar A from slipping into the grain-stack.

C represents the four outer hooks above referred to. To each of these hooks one of the chains marked H may be attached, as shown in Fig. 1. H represents the four chains, one of which is attached to each of said hooks C, as shown in Fig. 1. These chains may be long enough to be within eighteen inches from the ground when suspended from C. To each of these chains H a basket filled with fifty or more pounds of stone is attached by means of a hook. This will have the effect of keeping the bar A and the portions thereto attached in place and make the stacks secure against wind. The hooks at the ends of the chains H, to which the baskets are attached, are marked K.

I is a circular slightly-curved cover, made out of tin, with a hole cut in the center, so as to permit its being slipped upon the bar A, and so that it can rest on the upper cross-piece B. This cover I is kept in place by B and by a bar slipped through a hole cut into the bar A about half an inch above the cross-pieces B, which bar is designated as F upon Fig. 2. I have also another cover to answer the same purposes. On Fig. 2 it is marked J. This is a conical-shaped cover made of tin, and is slipped over the bar A the same as I. This is kept in place by the cross-pieces B and by a bar running through the upper portion of A, which bar is marked G. The hooks C are also designed to hold the cover I in place, as shown.

This device may also be used without either

I or J, by taking several bundles of grain and placing them so as to stand up against the bar A and between the hooks D, and by attaching wires or strings between the hooks D and the bar G. This will protect the entire stack, with the exception of the few bundles on top, from the weather.

I am aware that prior to my invention grain and hay stack-protectors have been made with a cover, pin, and cords. I therefore do not claim such a combination, broadly; but What I do claim as my invention, and desire to secure by Letters Patent, is—

1. The combination, in a grain-stack protector, with the bar A, of the cross-plates B, the hooks attached to said cross-plates, the cover held in place by the hooks, and the chains with weights attached hung to the hooks, substantially as set forth.

2. The combination, in a grain-stack protector, with the bar A, having a transverse perforation, of the cross-bars B, one of which is provided with the tubular extension E, having perforations in its sides aligned with the perforation in bar A, and the pin passing through said perforations, substantially as described.

3. The combination, in a grain-stack protector, of the bar A, with independent cross-bars B, each having a central perforation, whereby it can be slipped over bar A, and the cover I, having a like central perforation, and a fastening device applied to the lower bar, B, for securing it in position on bar A, substantially as described.

Chicago, February 9, 1884.

FLORIAN SCHAUER.

We hereby certify as witnesses that said FLORIAN SCHAUER signed the foregoing in our presence, and acknowledged that he did so of his own free will.

WILLIAM VOGEL,
EDGAR C. BLUM.